US010306129B1

(12) United States Patent
Bentley et al.

(10) Patent No.: US 10,306,129 B1
(45) Date of Patent: May 28, 2019

(54) LOCAL AND REMOTE VIDEO-CAMERA CONTROL

(71) Applicant: Amazon Technologies, Inc., Seattle, WA (US)

(72) Inventors: Peter Van Tuyl Bentley, Seattle, WA (US); Paul Berenberg, Los Altos, CA (US); Emmanuel J M Laffon de Mazieres, Burlingame, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/195,650

(22) Filed: Jun. 28, 2016

(51) Int. Cl.
| H04N 5/232 | (2006.01) |
| H04N 5/77 | (2006.01) |
| G06F 3/16 | (2006.01) |
| H04N 7/18 | (2006.01) |
| H04N 5/235 | (2006.01) |
| G03B 11/06 | (2006.01) |
| G03B 11/04 | (2006.01) |

(52) U.S. Cl.
CPC ............ *H04N 5/23206* (2013.01); *G06F 3/16* (2013.01); *H04N 5/23203* (2013.01); *H04N 5/77* (2013.01); *H04N 7/181* (2013.01); *G03B 11/043* (2013.01); *G03B 11/06* (2013.01); *H04N 7/185* (2013.01)

(58) Field of Classification Search
CPC ............ H04N 5/23203; H04N 5/23206; H04N 7/185; H04N 1/00307; H04N 21/43637; H04N 7/18; H04N 7/181; H04N 21/4363; H04W 4/008; G08B 13/19689; G08B 13/1966; G08B 13/19684; G08B 13/19656; G03B 11/06; G03B 11/041; G03B 11/043; G03B 11/045

USPC .................. 348/211.1–211.2, 211.4
See application file for complete search history.

(56) References Cited

U.S. PATENT DOCUMENTS

| 6,443,913 B1 * | 9/2002 | Kania ...................... A61B 5/11 128/202.11 |
| 7,423,670 B2 * | 9/2008 | Kawai ................ H04N 5/23203 348/143 |
| 8,121,078 B2 * | 2/2012 | Siann ..................... H04N 7/185 370/328 |
| 8,696,135 B2 * | 4/2014 | Yoon ................... G02B 27/1026 349/106 |
| 8,988,532 B2 * | 3/2015 | Soffer .................. G03B 11/043 348/207.1 |

(Continued)

FOREIGN PATENT DOCUMENTS

CN 204119392 U * 1/2015 ............... H04N 7/18

*Primary Examiner* — Ngoc Yen T Vu
(74) *Attorney, Agent, or Firm* — Lee & Hayes, P.C.

(57) ABSTRACT

This application describes techniques for controlling an apparatus that includes a camera both locally and remotely. The camera apparatuses described herein may include obfuscation components that function to selectively obfuscate a view of the camera at the request of a user. For instance, one particular camera apparatus may include a lens cap and an actuator to move the lens cap from a position in which the lens cap at least partially obfuscates the view of the camera to a position in which the lens cap does not (and vice versa). The camera apparatus may include a physical control to allow a user to locally request to open or close the lens cap, and may also include a network interface to communicate with a user device, thus allowing a user to remotely request to open or close the lens cap.

20 Claims, 7 Drawing Sheets

(56) References Cited

U.S. PATENT DOCUMENTS

| | | | |
|---|---|---|---|
| 9,083,937 B1* | 7/2015 | Oliphant | H04N 9/79 |
| 9,235,899 B1* | 1/2016 | Kirmani | H04N 5/33 |
| 9,911,318 B2* | 3/2018 | Boettcher | G08B 29/185 |
| 9,995,990 B2* | 6/2018 | Lim | G03B 11/06 |
| 2005/0068423 A1* | 3/2005 | Bear | H04N 5/23203 348/207.99 |
| 2007/0269202 A1* | 11/2007 | Forsyth-Martinez | G03B 11/00 396/429 |
| 2011/0115924 A1* | 5/2011 | Yu | G06F 1/1605 348/207.11 |

* cited by examiner

LOCAL AND REMOTE VIDEO-CAMERA CONTROL

BACKGROUND

Homes are becoming more wired and connected with the proliferation of computing devices such as desktops, tablets, entertainment systems, portable communication devices, speech-enabled devices, camera-based devices, and the like. As these computing devices evolve, many different ways have been introduced to allow users to interact with computing devices, such as through mechanical devices (e.g., keyboards, mice, etc.), touch screens, motion, and gesture. In some instances, users may desire flexibility in controlling these devices, while still maintaining security of these devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
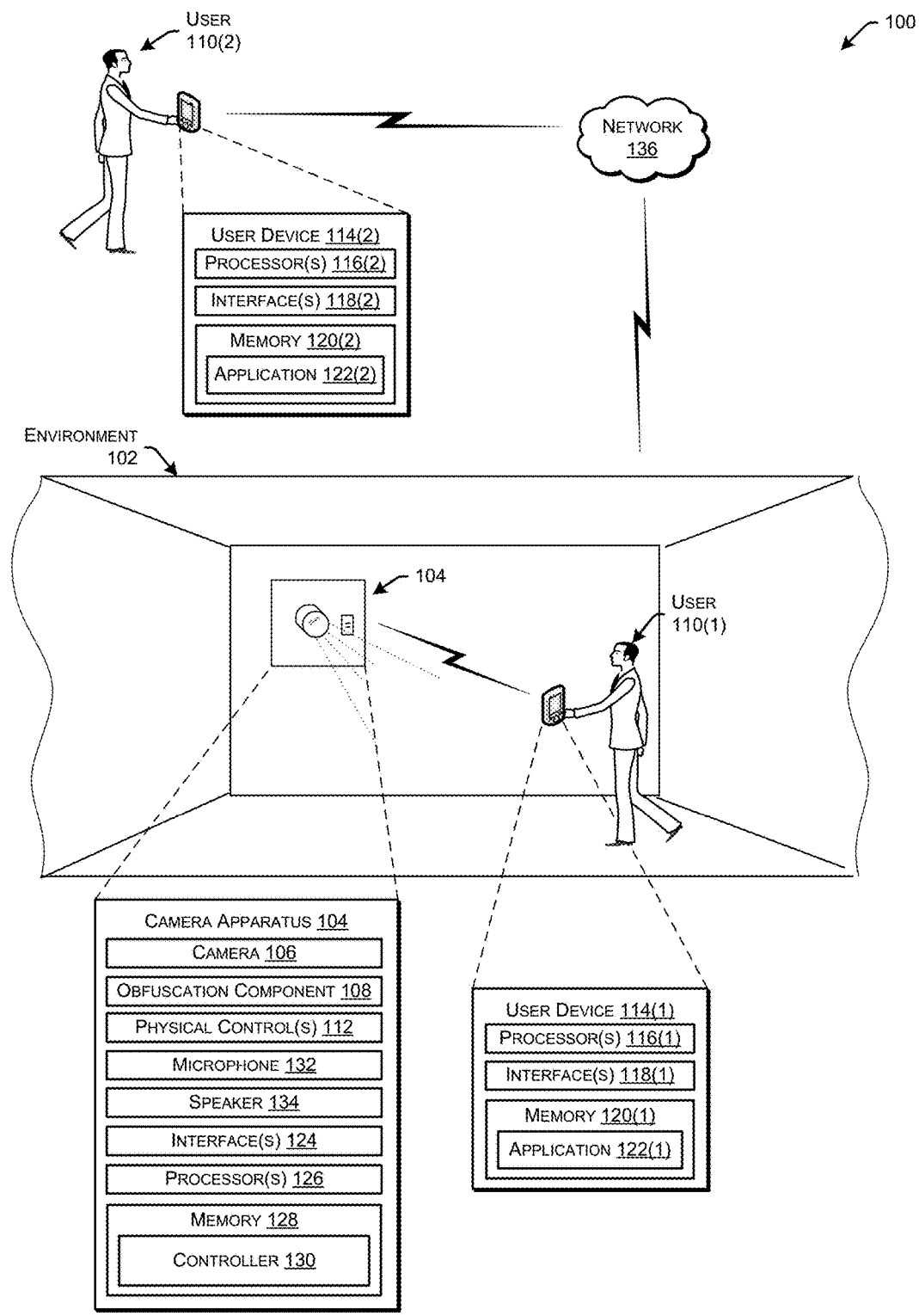
FIG. 1 is a schematic diagram of an environment that includes a camera apparatus configured to acquire video of the environment. The camera apparatus includes a camera, a lens cap (or other obfuscation component), and a physical control that is selectable to move the lens cap from a position that obfuscates a view of the camera to a position that does not (and vice versa). In some instances, the camera apparatus also includes a network interface for communicating with user devices to receive requests to open or close the lens cap. In some instances, the camera apparatus is configured to allow users to open the lens cap when a request is received over a personal area network (PAN) (e.g., Bluetooth, Zigbee, etc.) while not allowing users to open the lens cap over a wide area network (WAN) (e.g., "over the cloud").

Techniques for controlling an apparatus that includes a camera both locally and remotely are described herein. As described above, home, offices, and other environments often include an array of computing devices, including those that include cameras, such as security cameras, web cameras, and the like. The camera apparatuses described herein may include one or more obfuscation components that function to selectively obfuscate a view of the camera at the request of a user. For instance, one particular camera apparatus may include a lens cap and an actuator to move the lens cap from a position in which the lens cap at least partially obfuscates the view of the camera to a position in which the lens cap does not (and vice versa).

To allow the user to control the lens cap of the camera in this manner, the camera apparatus may include a physical control that is selectable by a user to cause the actuator to move the lens cap between the open and closed positions. The physical control may comprise a push button, a toggle switch, a touch screen, or any other type of physical control. Furthermore, the camera apparatus may include a network interface for communicating with other devices, such as mobile devices of a user, other appliances within the environment of the camera apparatus, and/or the like. In some instances, a user device (e.g., a mobile phone, a table device, etc.) may include a companion application for interacting with the camera apparatus. A user may use this application to issue a request to open and/or close the lens cap.

For instance, when a user device couples to the camera apparatus via a personal area network (PAN), such as Bluetooth, Zigbee, Z-Wave, or the like, the user may operate her companion application on her device to issue a request to open or close the camera. For instance, when the user returns home from work, she may wish to close her camera given that she no longer feels the need for a security feed. Or, when the user returns home from work, she may wish to open her camera to engage in a video call or the like. In either instance, the device of the user may issue the request to the camera apparatus, which may receive the request and open or close the lens cap as appropriate.

In other instances, the user device may communicate with the camera apparatus over a wide area network (WAN), such as the Internet, a cellular network, or the like. For instance, when the user is at work, she may wish to open her camera to view the current state of her home. Or, the user may wish to close the camera. In either instance, the user may issue this request via her companion application and, in response, the camera may open or close the lens cap as appropriate.

In some instances, however, for security reasons the camera apparatus may be configured to respond to requests issued over PANs but not WANs (or vice versa). For instance, in some instances the camera apparatus may open or close the lens cap as requested when the request is received over Bluetooth, Zigbee, or the like, meaning that the requesting user is proximate to the camera apparatus (e.g., within meters of the camera apparatus). Conversely, when the user device makes such a request "over the cloud", the camera apparatus may refrain from performing the operation, thus lessening the risk that a nefarious user may remotely attempt to control the camera apparatus without the permission of the owner of the camera apparatus.

In still other instances, the camera apparatus may be configured to accept or deny request based both on the network over which the request is received and the nature of the request itself. For instance, the camera apparatus may allow a user device to close the lens cap when communicating with the camera apparatus over a WAN, while not allowing the user to open the lens cap when communicating with the camera apparatus over the WAN. Further, the camera apparatus may allow the user device to both open and close the lens cap when communicating with the camera apparatus over a PAN. Still further, the physical control that is adjacent to the camera on a housing of the camera apparatus may be used to both open and close the lens cap.

In some instances, the camera apparatus may receive a request to open or close the obfuscation component from devices that are local within the environment of the camera apparatus. For instance, when coupled or adjacent to a building, upon a door lock of a door of the building being unlocked, the door lock may send a request over a PAN (i.e., a short-range wireless communication channel) to the camera apparatus to open or close the obfuscation component. In some instance, the camera apparatus may permit these requests when they are received from the local devices. Further, in some instances the camera apparatus may permit these requests when they are received from these local devices and when they specify a particular one of opening or closing the obfuscation component. For example, the camera apparatus may open the obfuscation component in response to receiving a request to do so from the door lock or other local device, while denying such a request from the door lock or other local device to close the obfuscation component. Of course, in some instances the converse may be true. Further, in some examples the camera apparatus may comply with a request of the door lock or other local device regardless of the nature of the request.

In the above example, the door lock may additionally or alternatively send a request to begin or cease recording. That is, rather than or in addition to sending a request to open or close the obfuscation component, the door lock may be configured to issue a request to the camera apparatus to begin (or cease) recording. In one example, when a door lock is unlocked, the door lock sends an indication of this action to the camera apparatus and, in response, the camera apparatus ceases its recording. In some instances the converse may be true, as the camera apparatus may begin recording in response to receiving this indication from the door lock. In another example, when the door lock is changed to an unlocked state, the door lock may send an indication of the locking action to the camera apparatus. In response, the camera apparatus begins recording. In another example, when the door lock is changed to the unlocked state, however, the camera apparatus ceases recording.

In some instances, a particular door lock may be associated with a particular camera apparatus such that the particular camera begins recording upon locking or unlocking of the particular door lock, rather than another camera or another door. To do so, the camera apparatus or a remote device (e.g., a server accessible via a network) may store an association between an identifier of the particular camera apparatus and an identifier of the particular door lock, along with particular instructions regarding actions taken by the particular camera apparatus in response to different state changes of the door lock. For instance, the camera apparatus or the remote device may store an indication that the particular camera apparatus is to begin recording (including opening the obfuscation component) when the door lock transitions from a locked state to an unlocked state (or vice versa). Alternatively, the camera apparatus or the remote device may store an indication that the particular camera apparatus is to begin recording (including opening the obfuscation component) when the door lock transitions from the locked state to the unlocked when the door lock is activated locally via a PAN as opposed to remotely over a WAN (or vice versa). That is, in instances where the door lock is controllable both via short-range wireless communication channels and over a WAN, the camera apparatus may be configured to execute differently depending on the nature of the operation of the door lock.

Furthermore, while the above-referenced example describes a door lock issuing a request over a PAN to the camera apparatus, in some instances other devices within the environment may issues these requests. For instance, when a motion sensor detects motion within an environment of the camera apparatus, the motion sensor may provide an indication of this motion to the camera apparatus either directly or via another device. In response to receiving this indication, the camera apparatus may open its obfuscation component and/or begin recording. Of course, in some instances, the opposite may occur.

In another example a mobile device executing a particular application may send, to the camera apparatus directly or indirectly, a request to open (or close) the obfuscation component and/or a request to begin (or cease) recording of the environment by the camera apparatus. For instance, a delivery person dropping a package off at a residence of a user may carry a mobile device executing an application configured to communicate, via an interface of the mobile device, with the camera apparatus at the residence or with a local device such as a door lock. In response to receiving an indication of the presence of the mobile device over a short-range wireless communication channel, the camera apparatus may open (or close) the obfuscation component and/or may begin (or cease) recording. In one specific example, a door lock may be configured to transition from a locked state to an unlocked state in response to detecting a particular communication, such as an indication of the presence of the mobile device of the delivery person in the above example. The door lock may also, in response, send an indication over a PAN to the camera apparatus may open (or close) the obfuscation component and/or may begin (or cease) recording. When the door lock ceases to receiving the indication of the presence of the mobile device of the delivery person, the door lock may send an indication to the camera apparatus, which may alter its state (e.g., to cease recording and close the obfuscation component), and the door lock may also transition from the unlocked state back to the locked state. While one example is given, it is to be appreciated that the camera apparatus may change its state in response to receiving a communication from any other local device over a PAN.

In some instances, while the camera apparatus may not allow a device to open the lens cap when communicating over a WAN, the camera apparatus may provide video to an authenticated device making a request for video over the WAN. For instance, a user device may execute an application that allows a user to view video generated by the camera apparatus when the user is authenticated. For instance, the user may need to sign in with the application via a username/password combination, biometric information (e.g., thumbprint data, etc.), or the like. After doing so, the user may issue requests to receive video generated by the camera apparatus via any network, including a PAN and a WAN. In response to receiving these requests, the camera apparatus may send the video over the appropriate network given that the device/user is authenticated as discussed above. However, in some instances the user might still be unable to open the lens cap when communicating over the WAN. Therefore, the camera apparatus may provide video to the requesting user device regardless of the state of the lens cap (open or closed), while not allowing the user device to change the state of the obfuscation component over the WAN.

In some instances, the camera apparatus may include a sensor to detect when the lens cap is unable to be closed, such as due to the existence of a foreign object (e.g., a child's finger) in the path of travel of the lens cap. In response to making this determination, the camera apparatus may send an indication that the lens cap has been unable to close (or open) to a user device that issued the request, if appropriate. Further, if the request originated from a user device, the camera apparatus may send one or more images (e.g., a video feed or a still image) to the user device that sent the request. This sensor may comprise a pressure sensor that detects when the lens cap is subject to pressure greater than a threshold. In response to detecting this amount pressure, the actuator may retract the lens cap and send the indication to the user device if appropriate. In another example, the sensor may comprise a laser aligned with a receiving camera. If the camera is unable to detect the laser at any point during the movement of the lens cap—indicating the presence of a foreign object in the path of travel—the lens cap may retract an indication may be sent if appropriate.

While the above example describes a lens cap, the camera apparatuses described herein may utilize other types of obfuscation components. For instance, a camera may include a light-source (e.g., an LED) within the camera or outside of the camera that obfuscates the camera by effectively blinding the camera (e.g., overexposing the camera's image sensor to light input). For instance, the light-source may be configured to emit light substantially parallel to an optical axis of the camera, thus preventing the camera from capturing image of the environment. In some instances, this light-source may emit light outwards towards the environment, while in other instances the light-source may emit the light away from the environment (i.e., "into" the camera). In either instance, the light may effectively blind the camera and may be visible to a user within the environment, thereby assuring the user that the view of the camera has been obfuscated.

In another example, the camera may include a lightguide configured to disseminate light for blinding the camera. For instance, the lightguide may comprise a transparent lens that resides within the optical path of the camera. The lightguide may include grating elements that function to disperse light when light is received from an edge of the lightguide (perpendicular to the optical axis of the camera). Therefore, the obfuscation component may comprise the lightguide and a light-source along an edge of the lightguide, such that when the user requests to obfuscate the view of the camera the light-source is illuminated. This light is emitted towards the lightguide, which disseminates the light substantially in the direction of the camera, thus effectively blinding the camera.

In still other instances, the obfuscation component may comprise a colored lens or the like that is insertable within the optical path of the camera. When the user requests to obfuscate the view of the camera, an actuator may move the colored lens from a position in which it does not reside within the optical path into a position in which it does. This colored lens may reside within the camera or outside of the camera, similar to a lens cap. Further, because of the color of the lens, when the lens resides within the optical path of the camera, the user may receive assurance that the view of the camera is being obfuscated.

In still other instances, the camera apparatus may include a microphone for capturing audio from the environment of the apparatus, as well as a speaker for outputting audio within the environment. In these instances, a user within the environment may be able to use the apparatus to conduct voice communications with remote users, such as a user executing the companion application on her user device. That is, the camera apparatus may send audio signals generated using the microphone to the companion application, which may in turn send generated audio signals for output on the speaker of the camera apparatus within the environment. In addition, the camera apparatus may send video of the environment to the companion application.

In some instances, however, a user may wish to effectively "mute" the microphone. Again, the user may issue such a request via a physical control on the apparatus and/or over a network from a user device (e.g., via the companion application). In response to receiving a request to mute the microphone, the camera apparatus may send an instruction to the speaker to output sound, such as white noise, such that other sound from the environment, such as user speech, is unintelligible from any audio signal generated by the microphone. Further, the white noise may be perceptible to the human ear such that the user within the environment receives assurance that the microphone has been effectively muted. As above, the apparatus may allow a user to mute (or un-mute) the microphone via a physical control of the apparatus or via a PAN, while not allowing the user to do so over a WAN. In some instances, the apparatus may allow user devices to mute the microphone over a WAN while not allowing user devices to un-mute the microphone over the WAN.

FIG. 1 is a schematic diagram of an environment 102 that includes a camera apparatus 104 that includes a camera 106 configured to acquire video of the environment 102. In addition, the camera apparatus includes an obfuscation component 108 that is able to selectively obfuscate a view of the camera. As described above, the obfuscation component 108 may comprise a lens cap that is able to move between open and closed positions, a light-source configured to blind the camera 106, a light-source and a lightguide, or any other component capable of interfering with the video acquisition by the camera 106. In instances where the obfuscation component 108 comprises a physical covering, such as lens cap or colored lens, this component may include or couple with an actuator to mechanically move the physical covering into place.

In some instances, a user 110(1) within the environment 102 and/or a user 110(2) outside of the environment may request to obfuscate or cease obfuscating the view of the camera 106. These requests may be requested both locally and remotely in some instances. As illustrated, the camera apparatus 104 may include one or more physical controls 112 that, when selected, cause the obfuscation component to begin obfuscating or cease obfuscating the view of the camera. For instance, the physical control 112 may comprise a push button, a toggle switch, a touch screen, or the like.

In addition, a user may issue a request to obfuscate and/or cease obfuscating the view of the camera using a respective device 114(1) or 114(2) of the user. As illustrated, each user device includes respective processor(s) 116(1) or 116(2), network interfaces 118(1) or 118(2), memory 120(1) or 120(2), and a companion application 122(1) or 122(2) stored in the memory and executing on the processors. As such, each of the users may utilize their respective user devices to issue requests via their respective companion applications.

Each of the network interfaces 118(1) and 118(2) may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interfaces 118(1) and 118(2) may include a wide area network (WAN) component to enable communication over a wide area network.

The stated IEEE 802.15.4 is intended to provide fundamental lower network layers of a type of wireless personal area network (WPAN) that is relatively low-cost, low-speed and ubiquitous between devices. This standard may offer less bandwidth and require less power than other standards. This standard is focused on very low cost communication of nearby devices with little to no underlying infrastructure, to take further advantage of its lower power consumption. This standard may generally provide a 10-meter communications range with a transfer rate of approximately 250 kbit/s in some instances.

The IEEE 802.15.1 standard, meanwhile, is another wireless technology standard for exchanging data over short distances (using short-wavelength UHF radio waves in the ISM band from 2.4 to 2.485 GHz) from fixed and mobile devices, and building personal area networks (PANs). The IEEE 802.11 standard, meanwhile, is a set of media access control (MAC) and physical layer (PHY) specifications for implementing wireless local area network (WLAN) computer communication in the 900 MHz and 2.4, 3.6, 5, and 60 GHz frequency bands. Of course, while a few examples have been introduced, it is to be appreciated that other implementations may implement other wireless-communication standards.

As illustrated, the camera apparatus 104 further includes network interface(s) 124, processor(s) 126, and memory 130, which stores a controller 130 that is configured to issue instructions to the obfuscation component 108 to obfuscate or cease obfuscating the view of the camera 106. The camera apparatus 104 may further include one or more microphones 132 and one or more speakers 134 as described below.

As used herein, a processor may include multiple processors and/or a processor having multiple cores. Further, the processors may comprise one or more cores of different types. For example, the processors 404 may include application processor units, graphic processing units, and so forth. In one implementation, the processor 404 may comprise a microcontroller. The microphones 132, meanwhile, may comprise an acoustic-to-electric transducer or sensor that converse sound from the environment into an electrical signal, while the speakers 134 may comprise one or more electroacoustic transducers that convert electrical audio signals into corresponding sounds for output in the environment.

The memory 128, as well as each memory described herein, may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 116 may be implemented as computer-readable storage media ("CRSM"), which may be any available physical media accessible by the processor(s) 126 to execute instructions stored on the memory 128. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 126.

Further, functional modules are shown stored in the respective memories, the same functionality may alternatively be implemented in hardware, firmware, application specific integrated circuits, field programmable gate arrays, or as a system on a chip (SoC). In addition, while not illustrated, each respective memory discussed herein may include at least one operating system (OS) module that is configured to manage hardware resource devices such as the interfaces 118(2) and 124, the I/O devices of the respective apparatuses, and so forth, and provide various services to applications or modules executing on the processors. Such OS module may implement a variant of the FreeBSD™ operating system as promulgated by the FreeBSD Project; other UNIX™ or UNIX-like variants; a variation of the Linux™ operating system as promulgated by Linus Torvalds; the Windows® operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth In some instances, the camera apparatus 104 is configured to allow users to open the lens cap when a request is received over a personal area network (PAN) (e.g., Bluetooth, Zigbee, etc.) while not allowing users to open the lens cap over a wide area network (WAN) (e.g., "over the cloud"), such as illustrated network 136. For instance, the user 110(1) may issue a request to obfuscate or cease obfuscating the view of the camera using the physical control 112 residing on the apparatus 104. Additionally or alternatively, the user 110(1) may pair his device 114(1) with the apparatus over a PAN and may issue a request to obfuscate or cease obfuscating the camera 106 over the PAN using the companion application 122(1). In response to receiving this request, the camera apparatus 104 may determine that the request originated from a device coupled to the apparatus over a PAN and, therefore, may issue an instruction in accordance with the received request to the obfuscation component 108. Further, while FIG. 1 illustrates a user operating a user device 114(1) to issue this request, in some instances another device, such as a smart appliance, within the environment may issue this request. For instance, a door lock or door sensor having the capability of communicating with the apparatus 104 over a PAN may issue a request to the apparatus in response to the door lock being unlocked or the door sensor detecting the opening of the door.

In other instances, meanwhile, the user 110(2) may issue a request to obfuscate or cease obfuscating the camera 106 using the companion application 122(2) executing on the user device 114(2). In this example, the device 114(2) couples to the apparatus 104 over the network 136. The network 136 may generally represent a WAN that comprises an array or wired networks, wireless networks (e.g., WiFi), or combinations thereof. In response to receiving the request from the device 114(2), the apparatus 104 may determine that the request has been received over the WAN network 136. In some instances, the apparatus 104 may accordingly deny the request and may send an indication of this denial to the user device 114(2). In other instances, in response to making this determination the apparatus 104 may send a request for authentication information to the user device 114(2). For instance, in response a request being received over a WAN, the apparatus 104 may request that a user provide a personal identification number (PIN), username/password, biometric information, or any other type of authentication information. If the user is authenticated, the apparatus 104 may perform the request. In still other instances, the apparatus 104 may be configured to perform certain requests received over a WAN but not others. For example, the apparatus 104 may execute a request over the WAN to obfuscate the camera 106 while not executing a request over the WAN to cease obfuscating the camera (or vice versa).

Figure 2A:
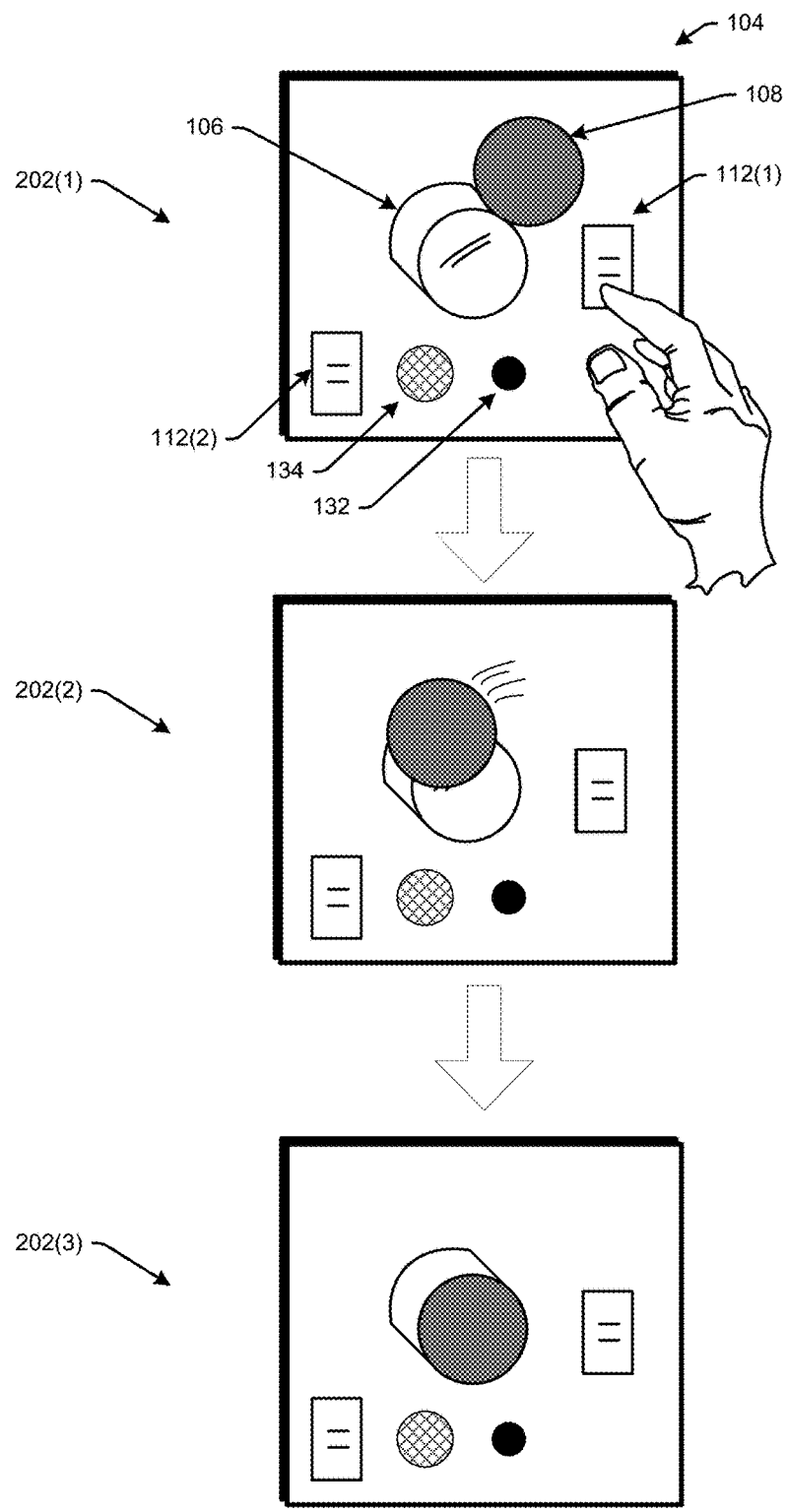
FIG. 2A illustrates an example flow of a user selecting the physical control of the camera apparatus of FIG. 1 and, in response, the lens cap moving from the position in which the lens cap is not obfuscating the view of the camera to the position in which it does obfuscate this view.

FIG. 2A illustrates an example flow of a user selecting a first physical control 112(1) of the camera apparatus 104 and, in response, the obfuscation component 108 beginning to obfuscate the camera 106. In this example, the obfuscation component 108 comprises a lens cap that is configured to mechanically move, via an actuator, from an open position to a closed position (and vice versa).

At 202(1), the user is shown selecting the physical control 112(1) while the lens cap is in the open position. The physical control 112(1) may comprise any kind of mechanical or digital control configured to generating and sending a control signal to the actuator to cause the actuator to close the lens cap. For instance, the physical control may comprise a depressible button, a toggle switch, a rotatable knob, a touchscreen control, or the like.

In response to the user selecting the physical control 112(1), at 202(2) the lens cap is shown being swiveled by the actuator from the open position to the closed position. The actuator may comprise any sort of component configured to control movement of the lens cap from the open position to the closed position and back. For instance, the actuator may comprise a mechanical actuator (e.g. spring-loaded, etc.), a hydraulic actuator, a pneumatic actuator, an electric actuator, a thermal or magnetic actuator, or the like. At 202(3), the lens cap is shown in the closed position, obfuscating the view of the camera 106. As such, the user has been able to close the lens cap via selection of the physical control 112(1) that is on a common housing as the camera 106. Further, the user may request to cease obfuscation of the camera 106 via a subsequent selection of the physical control 112(1).

Figure 2B:
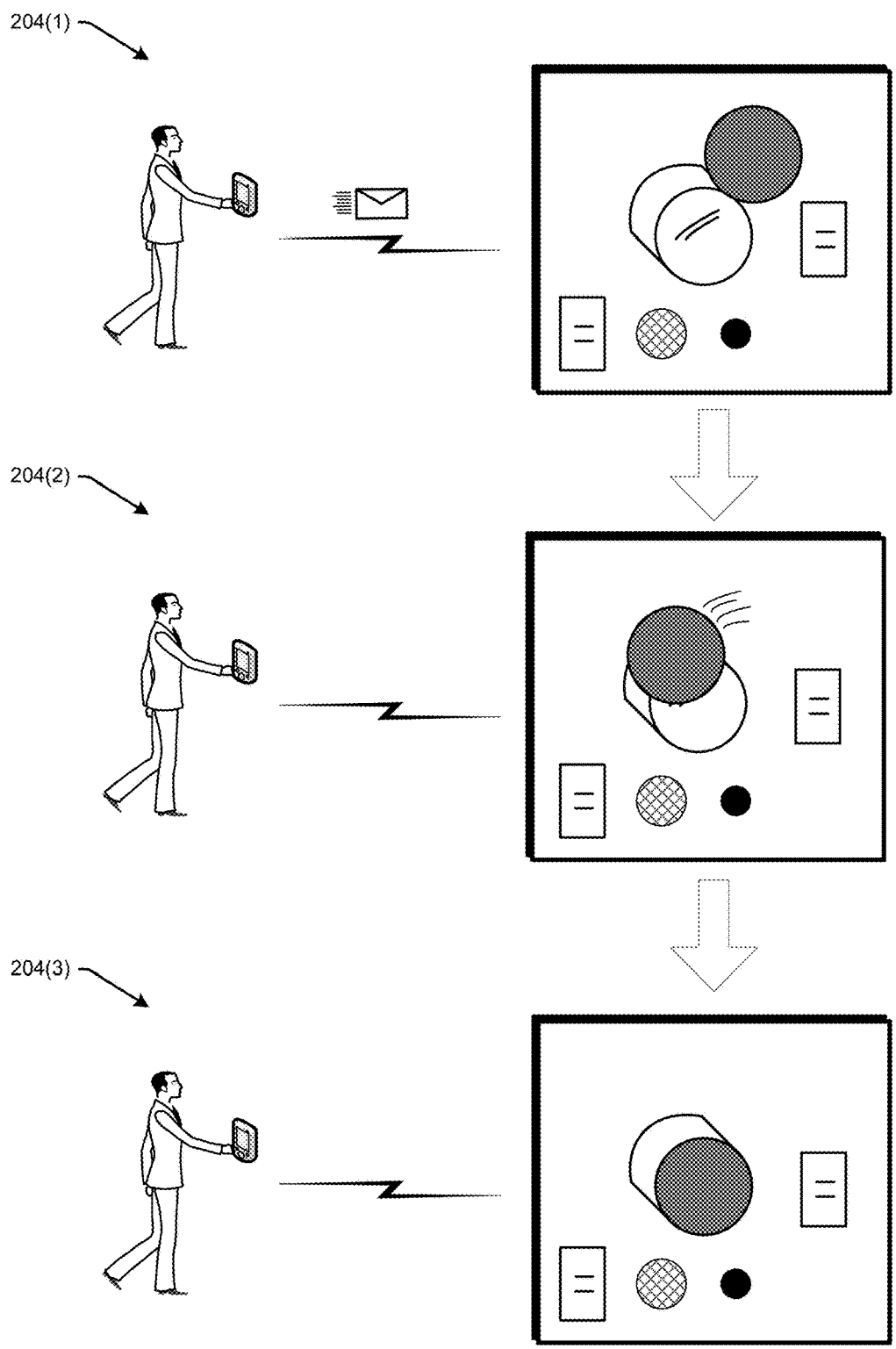
FIG. 2B illustrates an example flow of a user device issuing a request over a network to move the lens cap from the position in which the lens cap is not obfuscating the view of the camera to the position in which it does obfuscate this view. In some instances, the camera apparatus may allow a camera to be "opened" when the request is issued over a PAN (i.e., a short-range wireless communication channel).

FIG. 2B illustrates an example flow of a user device issuing a request over a network to move the lens cap from the position in which the lens cap is not obfuscating the view of the camera 106 to the position in which it does obfuscate this view. In some instances, the camera apparatus 104 may allow the camera 106 to be "opened" when the request is issued over a PAN (i.e., a short-range wireless communication channel), while not when the request is issued over a WAN. In either instance, the illustrated user device may execute an application that is configured to send the request to close (or open) the lens cap. The user make a selection to close (or open) the lens cap via the application and, in response, the device may send a corresponding request to the camera apparatus via a network interface on the device. In other instances, the request to close (or open) the lens cap may originate from another device within the environment of the camera apparatus as discussed above, such as a door lock, a motion sensor, or the like.

At 204(1), the user utilizes the companion application executing on the user device to issue a request to close the lens cap at a time when the lens cap is in an open position. At 204(2), the camera apparatus 104 has received the request and has begun closing the lens cap. In this example, the user device is local to the camera apparatus and the sends the request to the camera apparatus via a PAN (i.e., a short-range wireless communication channel). At 204(3), the lens cap has moved to the closed position. In some instances, the camera apparatus 104 may move the lens cap back to the open position in response to receiving another request from the user device.

Figure 3A:
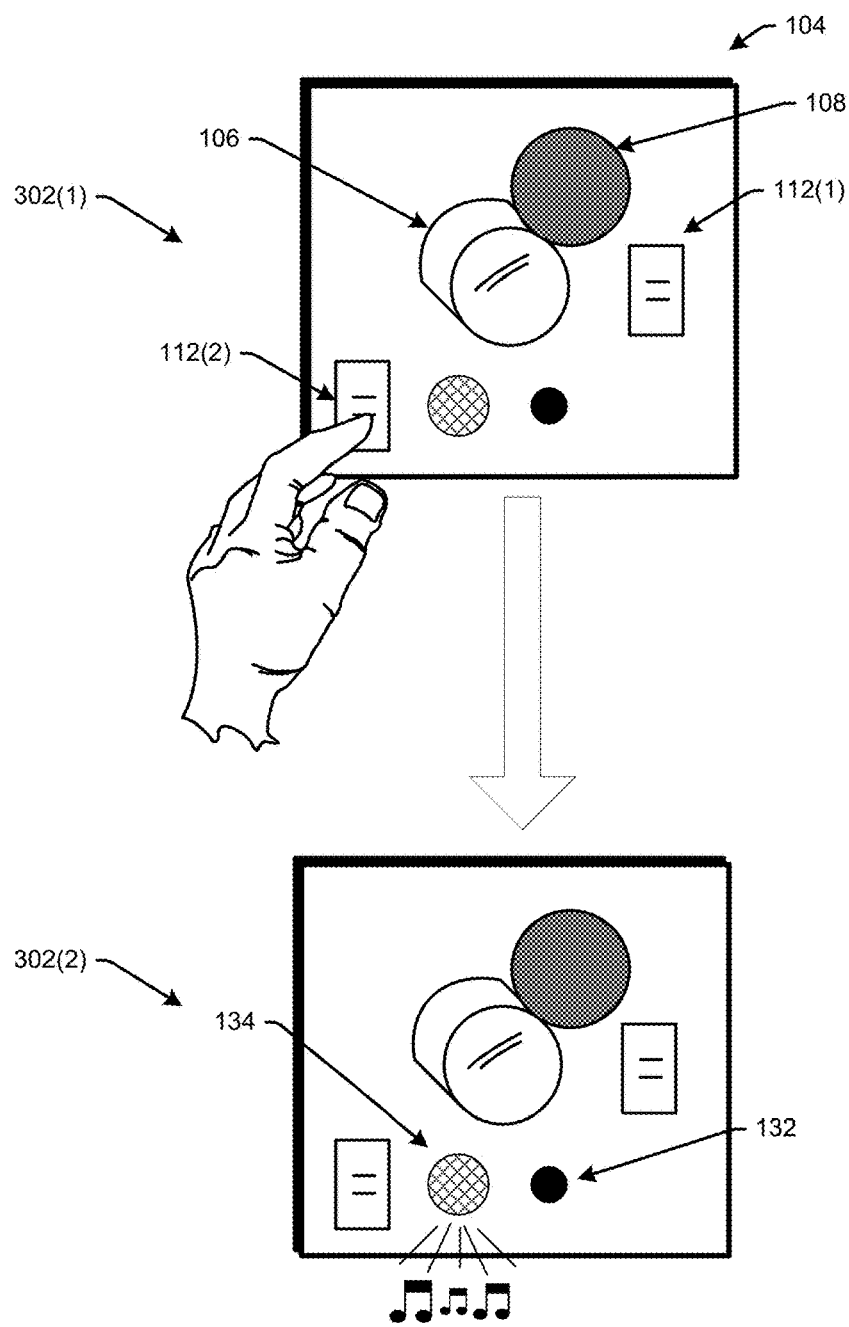
FIG. 3A illustrates an example flow of a user selecting an additional physical control of the camera apparatus of FIG. 1 to request to mute a microphone of the apparatus. In response, a speaker of the camera apparatus outputs sound (e.g., white noise) to effectively "mute" the microphone by rendering other sound from the environment (e.g., user speech) unintelligible in any audio signal generated by the microphone.

FIG. 3A illustrates an example flow of a user selecting an additional physical control 112(2) of the camera apparatus 104 to request to mute the microphone 132 of the apparatus 104. Again, the physical control 112(2) may comprise any kind of mechanical or digital control configured to generating and sending a control signal to the actuator to cause the actuator to close the lens cap. For instance, the physical control may comprise a depressible button, a toggle switch, a rotatable knob, a touchscreen control, or the like.

At 302(1), the user selects the physical control 112(2). At 302(2), in response, the speaker 134 of the camera apparatus 104 outputs sound (e.g., white noise) to effectively "mute" the microphone 132 by rendering other sound from the environment (e.g., user speech) unintelligible in any audio signal generated by the microphone. That is, in response to receiving a control signal generated in response to the user selecting the physical control 112(2) at 302(1), the speaker generates audio using a predefined audio signal, with the audio potentially comprising white noise for the purpose of masking any audio captured by the microphone of the camera apparatus. That is, by generating audio immediately adjacent to the microphone using the speaker, the camera apparatus lessens the likelihood that any audio signal generated at that time by the microphone will include intelligible conversation of users in the environment or other sounds.

Figure 3B:
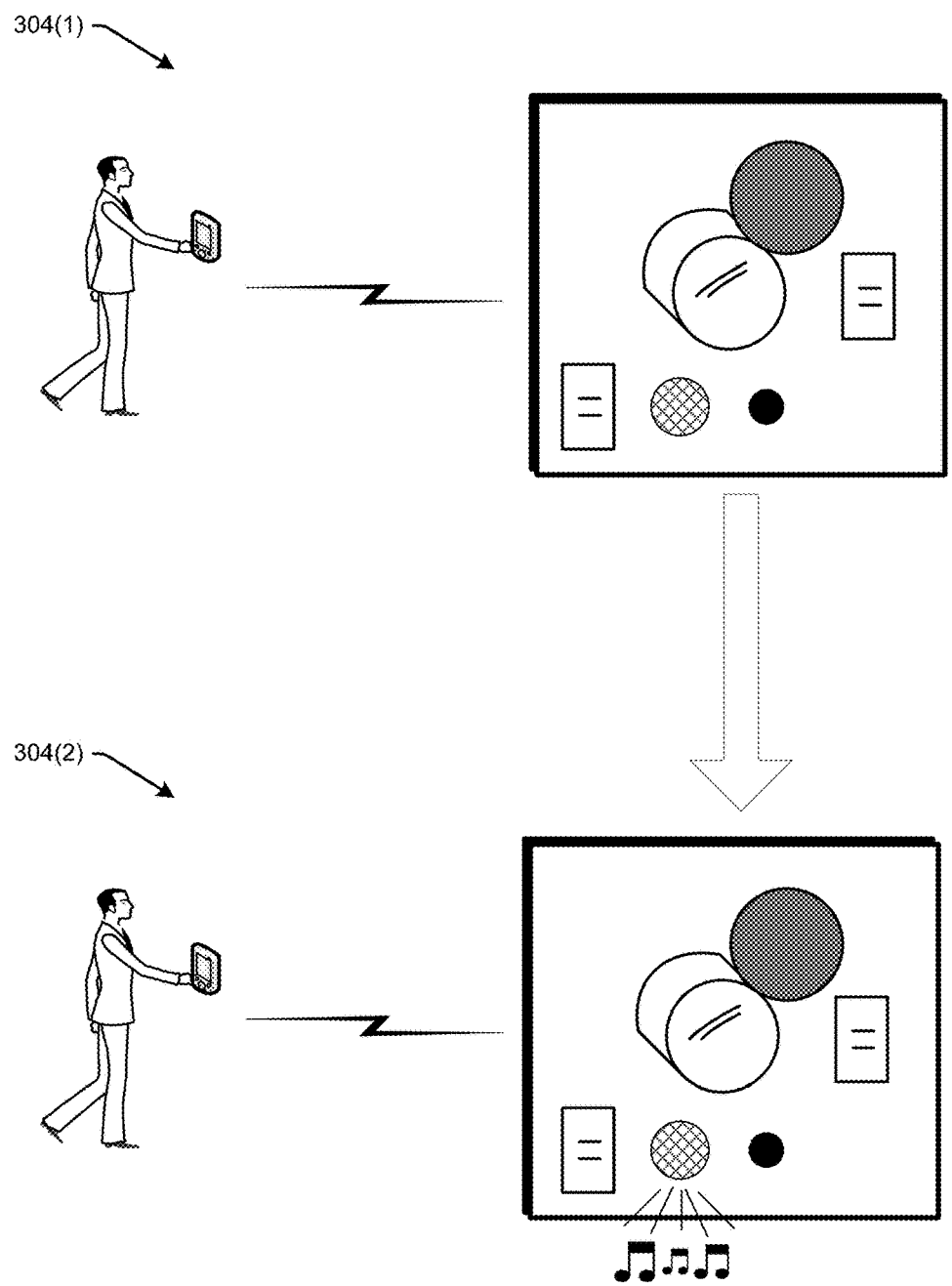
FIG. 3B illustrates an example flow of a user issuing a request over a network to effectively mute the microphone by outputting the white noise from the speaker.

FIG. 3B illustrates an example flow of the user issuing the request to mute the microphone over a network. In some instances, the camera apparatus 104 may allow the microphone 132 to be "muted" when the request is issued over a PAN (i.e., a short-range wireless communication channel), while not when the request is issued over a WAN (or vice versa). In either instance, the illustrated user device may execute an application that is configured to send the request to mute (or un-mute) the microphone 132. The user make a selection to mute (or un-mute) the microphone via the application and, in response, the device may send a corresponding request to the camera apparatus via a network interface on the device. In other instances, the request to mute (or un-mute) the microphone may originate from another device within the environment of the camera apparatus as discussed above, such as a door lock, a motion sensor, or the like.

At 304(1), the user operates his user device to send the request to the camera apparatus 104. At 304(2), and in response, the speaker 134 of the camera apparatus 104 outputs sound (e.g., white noise) to effectively "mute" the microphone 132 by rendering other sound from the environment unintelligible in any audio signal generated by the microphone.

Figure 4:
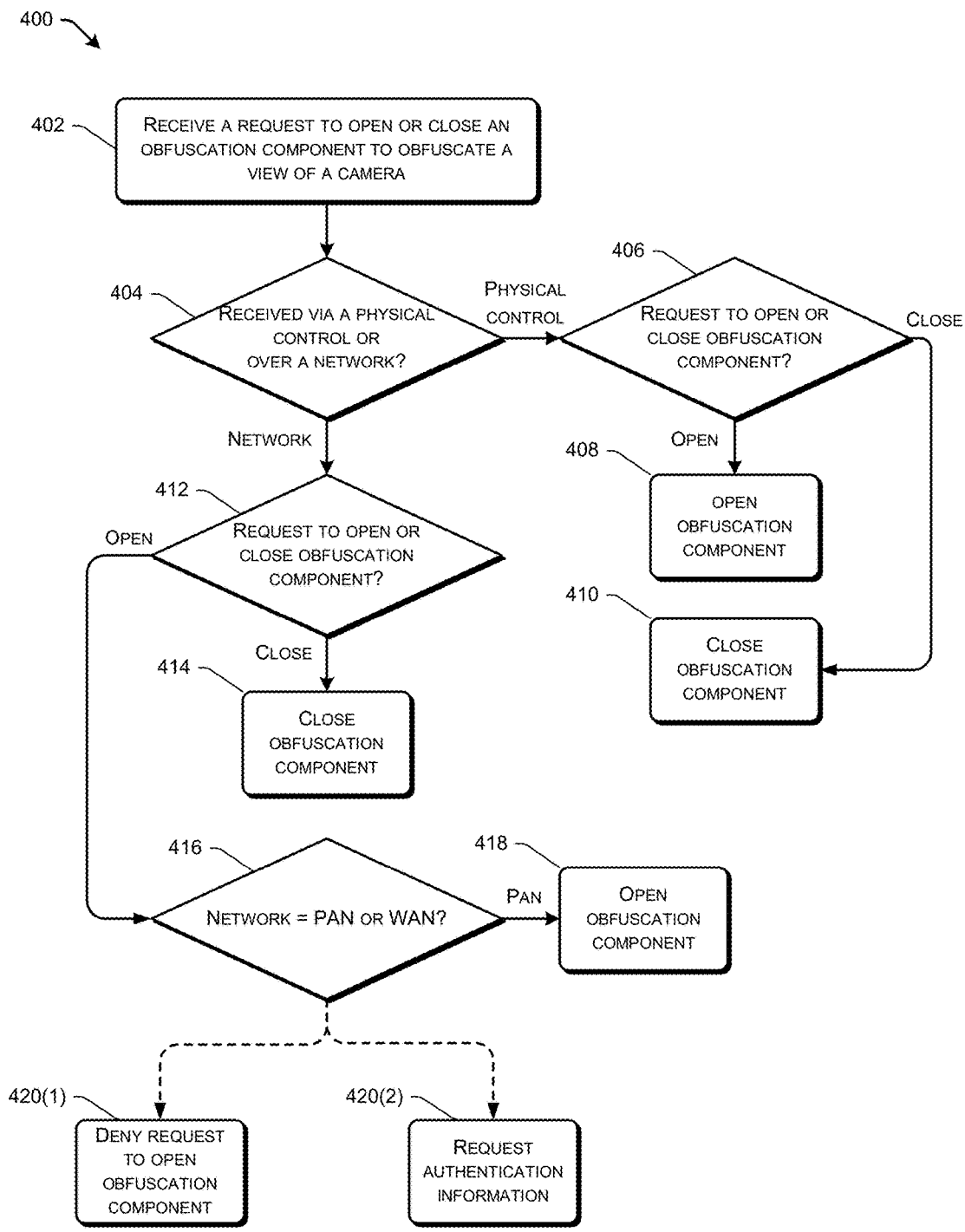
FIG. 4 illustrates a flow diagram of an example process for opening and/or closing a lens cap of a camera via a physical control on the apparatus or via a request issued over a network.

FIG. 4 illustrates a flow diagram of an example process 400 for opening and/or closing a lens cap of a camera via a physical control on the apparatus or via a request issued over a network. This process (as well as each process described herein) is illustrated as a logical flow graph, each operation of which represents a sequence of operations that can be implemented in hardware, software, or a combination thereof. In the context of software, the operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. In some instances, the operations performed in the processes 400 and 500 are performed by the controller 130.

At 402, the controller 130 receives a request to open or close an obfuscation component, such as a lens cap, colored lens, or the like, to obfuscate a view of a camera. For instance, the controller 130 may receive this request in response to a user selecting one of the physical controls above. The physical controls may comprise mechanical and/or digital controls. Alternatively, the controller 130 may receive the request over the network and via a network interface of the device on which the controller executes.

At 404, the controller 130 determines whether the request is received via a physical control or over a network. In some instances, a selection of a physical control may result in a request routed to the controller 130 in a manner that differs from the a request routed to the controller via the network interface of the device. Additionally or alternatively, a request received over the network may include header information or other types of information indicating that the request was set from a remote device, which a request originating via selection of a physical control at the device on which the controller 130 executes may lack.

In response to determining that the request is received via a physical control, at 406 the controller 130 determines whether the request is to open the obfuscation component or close the obfuscation component. For instance, the controller 130 may determine the current position of the obfuscation component and may interpret the request as a request to change the state of the obfuscation component to the opposite state. Additionally or alternatively, the request may include payload information specifying whether the obfuscation component is to be opened or closed.

In the instances where the request is determined to be a request to open the obfuscation component, at 408 the controller issues an instruction to the actuator of the obfuscation component to open the obfuscation component. That is, the controller 130 may issue a control signal that is executable by the actuator to open the obfuscation component. This may include instructing a mechanical actuator to close a lens cap.

In the instances where the request is determined to be a request to close the obfuscation component, at 410 the controller 130 issues an instruction to the actuator to close obfuscation component. That is, the controller 130 may issue a control signal that is executable by the actuator to close the obfuscation component. This may include instructing a mechanical actuator to close a lens cap. As the reader will appreciate, in this example the user is able to both open and close the obfuscation component when the user operates the obfuscation component via the physical control, given that the user in the same environment as the camera apparatus.

If, however, the controller 130 determines that the request is received over a network, at 412 the controller 130 determines whether the request is to open or close the obfuscation component. Again, the controller 130 may determine the current position of the obfuscation component and may interpret the request as a request to change the state of the obfuscation component to the opposite state. Additionally or alternatively, the request may include payload information specifying whether the obfuscation component is to be opened or closed.

If the latter, then at 414 the controller 130 may issue an instruction to the actuator to close the obfuscation component, regardless of the type of network over which the request is received. This may include sending a control signal to a mechanical, hydraulic, pneumatic, or other type of actuator instructing the actuator to physically move the obfuscation component to a closed position.

If, however, the request is to open the obfuscation component, then at 416 the controller may determine whether the network over which the request is received is a PAN or a WAN. For instance, the controller 130 may determine whether a PAN component received the request or whether the request was received via a WAN component. In another example, the controller 130 may analyze header or payload information associated with the request to determine whether the request was received by the camera apparatus via a PAN or via a WAN.

If the former instances, meaning that the device that sent the request is local to the camera apparatus, then at 418 the controller 130 may issue an instruction to the actuator to open the obfuscation component. Again, this may include sending a control signal to a mechanical, hydraulic, pneumatic, or other type of actuator instructing the actuator to physically move the obfuscation component to an open position If the latter, however, then at 420(1) the controller may deny the request to open the obfuscation component (given that the device is not local to the camera apparatus). That is, the camera apparatus may refrain from issuing the afore-mentioned control signal to open the obfuscations component.

In other instances, meanwhile, at 420(2) the controller 130 may instead request authentication information, such as PIN, from the user device that sent the request over the WAN. For instance, the camera apparatus may send, over the work, data to the device that sent the request, the data for rendering a user interface (UI) that requests and is configured to receive authentication information from the user of the device that sent the request. If the user device provides, to the camera apparatus in response to the rendering of the UI, appropriate authentication information, then the controller 130 may proceed to open the obfuscation component. That is, the controller 130 may send the appropriate control signal instructing the actuator to move the obfuscation component to the open position. Of course, while FIG. 4 illustrates one particular example, in other instances, the controller 130 might not open or close the obfuscation component when a request is received over a WAN. Or, the controller 130 may open or close the obfuscation component without regard to the type of network over which a request is received.

Figure 5:
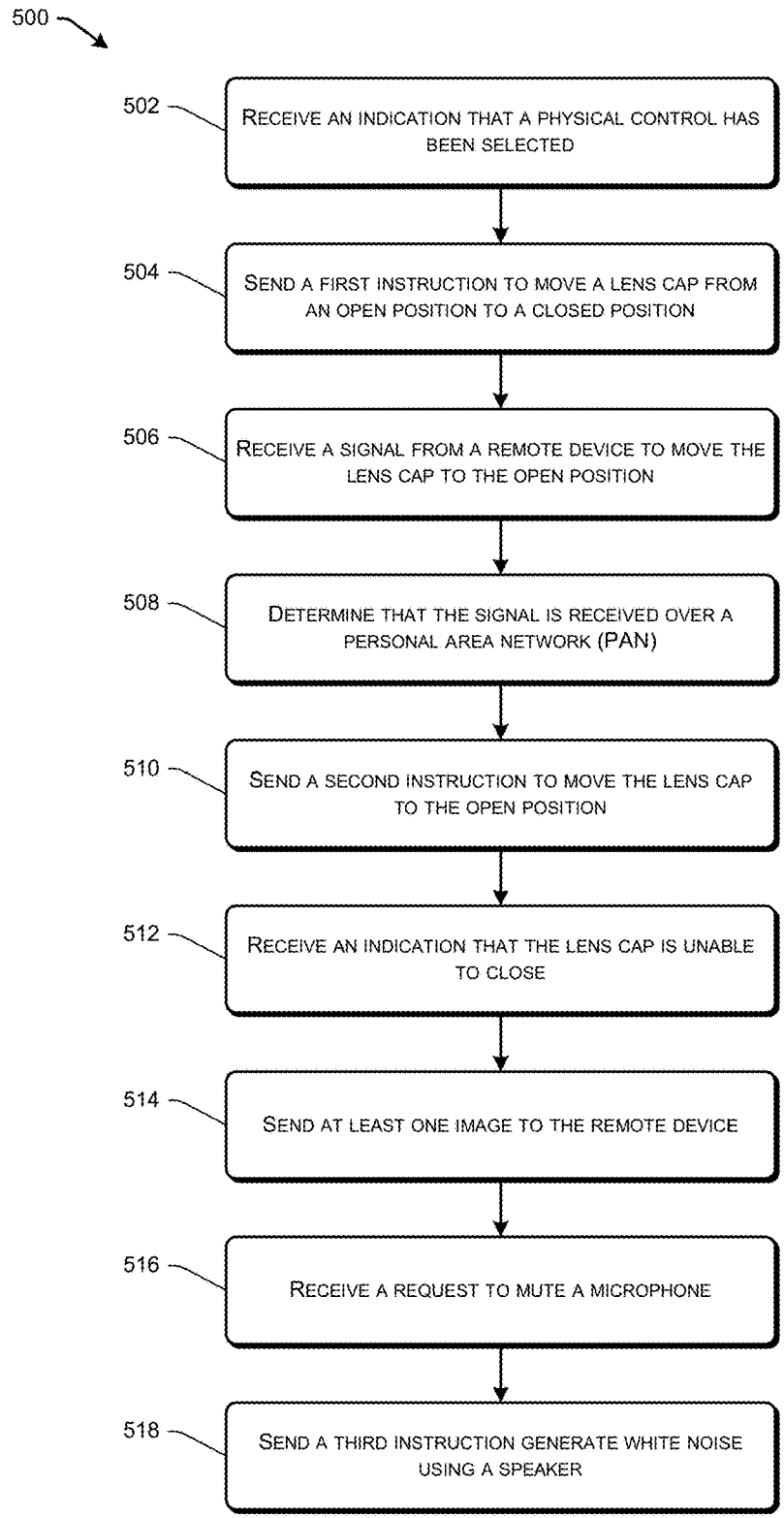
FIG. 5 illustrates a flow diagram of an example process for obfuscating a view of a camera and muting a microphone.

FIG. 5 illustrates a flow diagram of an example process 500 for obfuscating a view of a camera and muting a microphone. Again, the controller 130 may perform some or all of the process 500 in some instances. At 502, the controller 130 receives an indication that a physical control of a camera apparatus has been selected at a time when a lens cap of the camera apparatus resides in an open position. In some instances, a selection of a physical control may result in a request routed to the controller 130 in a manner that differs from the a request routed to the controller via the network interface of the device, thus allowing the controller 130 to accurately identify the genesis of the request. Additionally or alternatively, a request received over the network may include header information or other types of information indicating that the request was set from a remote device, which a request originating via selection of a physical control at the device on which the controller 130 executes may lack.

At 504, the controller 130 sends a first instruction to an actuator of the camera apparatus to move the lens cap from the open position to the closed position. For instance, the controller 130 may issue a control signal that is executable by the actuator to move the lens cap from an open to a closed position.

At 506, the camera apparatus receives, over a network, a signal from a remote device requesting to move the lens cap to the open position. At 508, the controller 130 determines in this example that the signal is received over a PAN. For instance, the controller 130 may determine that a short-range wireless interface received the request rather than a wide-area-network interface. In another example, the controller 130 may analyze header or payload information associated with the request to determine that the request was received by the camera apparatus via a PAN rather than a WAN.

At 510, and in response, the controller 130 proceeds to send a second instruction to the actuator to move the lens cap to the open position. Again, the controller 130 may issue a control signal that is executable by the actuator to move the lens cap from the closed to the open position. In response to receiving this control signal, the actuator may mechanically, pneumatically, hydraulically, or in any other manner move the lens to the open position.

Sometime thereafter, the controller 130 may receive a request to again move the lens cap to the closed position. In this example, the request is received from a user device over a network. In either instance, at 512 the controller may 130 receive an indication, from a sensor of the camera apparatus, that the lens is unable to close. For instance, a pressure sensor may send an indication that it has detected pressure that is greater than a threshold pressure, or a laser sensor may send an indication that a optical path of the laser is inhibited, thus presenting the potential that an object is within the path of closure of the lens.

At 514, in response the controller 130 may send at least one image to the user device that issued the request to close the lens cap. For instance, the controller 130 may send a video captured by the camera, thus allowing the user to see what it is that is keeping the lens cap from moving to the closed position. That is, the controller may cause video or a still image captured by the camera to be send, over the network, to the device from the request originated.

At 516, meanwhile, the controller 516 receives a request, via a physical control or from a user device over a network, to mute a microphone of the device. Again, the controller 130 may receive an indication that a physical control present on the actual apparatus has been selected. At 518, and in response, the controller 130 sends a third instruction to a speaker of the apparatus to cause the speaker to output white noise, thus rendering other sound from the environment of the apparatus unintelligible from any audio signal generated by the microphone of the apparatus. For instance, the control signal may send a request that the speaker output a particular predefined audio signal to mask any noises from the environment within an audio signal that may be subsequently generated by the microphone.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An apparatus comprising:
a camera to generate video data representing an environment;
a lens cap configured to cover a lens of the camera;
an actuator to move the lens cap between an open position in the which the lens cap does not cover the lens and a closed position in which the lens cap covers the lens;
a physical control to request to move the lens cap from the open position to the closed position;
a personal area network (PAN) component to enable communications compliant with at least one of the following standards IEEE 802.15.4 (ZigBee), IEEE 802.15.1 (Bluetooth) or IEEE 802.11 (WiFi);
one or more processors; and
one or more non-transitory computer-readable media storing computer-executable instructions that, when executed on the one or more processors, cause the one or more processors to perform acts comprising:
receiving, via the PAN component, a signal from an electronic device that is separate from the apparatus, the signal comprising an indication to move the lens cap from the closed position to the open position;
determining that the signal was received via the PAN component; and
causing the actuator to move the lens cap from the closed position to the open position based at least in part on the determining that the signal was received via the PAN component.

2. The apparatus as recited in claim 1, further comprising a wide area network (WAN) component to enable communications with devices over one or more WAN, and wherein the signal comprises a first signal, the electronic device comprises a first electronic device, and the acts further comprise:
receiving, via the WAN component, a second signal from a second electronic device that is separate from the apparatus, the second signal comprising another indication to move the lens cap from the closed position to the open position;
determining that the second signal was received via the WAN component; and
sending, to the second electronic device and based at least in part on the determining that the second signal was received via the WAN component, a third indication that the lens cap will not be moved from the closed position to the open position.

3. The apparatus as recited in claim 1, further comprising a wide area network (WAN) component to enable communications with devices over one or more WAN, and wherein the signal comprises a first signal, the electronic device comprises a first electronic device, and the acts further comprise:
receiving, via the WAN component, a second signal from a second electronic device that is separate from the apparatus, the second signal comprising another indication to move the lens cap from the closed position to the open position;

receiving authentication information from the second electronic device; and causing the actuator to move the lens cap from the closed position to the open position.

4. The apparatus as recited in claim 1, wherein the apparatus and a mobile device are associated with a common user account, and the acts further comprise:

receiving an indication that the actuator encountered a foreign object and is unable to move the lens cap from the at least one of the closed position to the open position or from the open position to the closed position; and sending at least one image generated by the camera to the mobile device.

5. The apparatus as recited in claim 1, further comprising:
a microphone to generate an audio signal based on sound captured from the environment; and
a speaker, proximate to the microphone, to generate white noise;
and the acts further comprising:
receiving data indicating to mute the microphone; and
causing the speaker to generate the white noise to obfuscate at least a portion of sound from the environment present in the audio signal.

6. An apparatus comprising:
a camera;
an obfuscation component to at least partly obfuscate a view of the camera;
a physical control to request to at least partially obfuscate the view of the camera;
a personal area network (PAN) component to enable communications compliant with at least one of the following standards IEEE 802.15.4 (ZigBee), IEEE 802.15.1 (Bluetooth) or IEEE 802.11 (WiFi);
one or more processors; and
one or more non-transitory computer-readable media storing computer-executable instructions that, when executed on the one or more processors, cause the one or more processors to perform acts comprising:
receiving, via the PAN component, from a device, an indication to cease obfuscation of the view of the camera;
determining that the indication was received via the PAN component; and
causing the obfuscation component to cease obfuscation of the view of the camera based at least in part on the determining that the indication was received via the PAN component.

7. The apparatus as recited in claim 6, wherein the acts further comprise:
receiving, via the physical control, a second indication to at least partially obfuscate a view of the camera; and
causing the obfuscation component to at least partly obfuscate the view of the camera.

8. The apparatus as recited in claim 6, further comprising a wide area network (WAN) component to enable communications with devices over one or more WAN, and wherein the device comprises a first device and the acts further comprise:
receiving, via the WAN component, from a second device, a second indication to cease obfuscation of the view of the camera; and
sending, to the second device, an indication that the obfuscation component will not cease obfuscation of the view of the camera.

9. The apparatus as recited in claim 6, wherein the obfuscation component comprises:

a lens cap configured to physically cover a lens of the camera; and
an actuator configured to move the lens cap between a first position physically covering the lens of the camera and a second position in which the lens cap does not physically cover the lens of the camera.

10. The apparatus as recited in claim 6, wherein the obfuscation component comprises a light-source configured to emit light substantially parallel to an optical axis of the camera, the light-source configured to turn on to at least partially obfuscate the view of the camera and turn off to cease obfuscation of the view of the camera.

11. The apparatus as recited in claim 6, wherein the obfuscation component comprises:
a light-source configured to emit light; and
a lightguide at least partially within the camera to disseminate the light from the light source to at least partially obfuscate the view of the camera.

12. The apparatus as recited in claim 6, wherein the apparatus and a mobile device are associated with a common user account and the acts further comprise:
receiving another indication that the obfuscation component is unable to at least partly obfuscate the view of the camera; and
sending at least one image generated by the camera to the mobile device.

13. The apparatus as recited in claim 6, further comprising:
a microphone to generate an audio signal based on sound from an environment of the apparatus; and
a speaker, proximate to the microphone;
and the acts further comprising:
receiving a second indication to mute the microphone; and
causing the speaker to generate noise to obfuscate at least a portion of the sound from the environment of the apparatus.

14. A method implemented at least in part by an apparatus that includes a camera, an obfuscation component to at least partly obfuscate a view of the camera, a personal area network (PAN) component to communicate with a device over a PAN, and a physical control to request to at least partially obfuscate the view of the camera, the method comprising:
receiving, via the PAN component, from the device, an indication to cease obfuscation of the view of the camera;
determining that the indication was received via the PAN component; and
causing the obfuscation component to cease obfuscation of the view of the camera at least partly in response to the determining that the indication was received via the PAN component.

15. The method as recited in claim 14, wherein the request comprises a first request, the device comprises a first device, and further comprising:
receiving, via a wireless area network (WAN) component, from the second device, a second indication to cease obfuscation of the of the view of the camera;
sending, to the second device, data that the obfuscation component will not cease obfuscation of the view of the camera;
receiving, via the WAN component, from the second device, a third indication to receive video generated by the camera; and
sending, via the WAN component, to the second device, the video generated by the camera.

16. The method as recited in claim 14, wherein the device comprises a first device, and further comprising:
   receiving, via a wireless area network (WAN) component, from a second device, a second indication to cease obfuscation of the view of the camera;
   sending, to the second device, data that the obfuscation component will not cease obfuscation of the view of the camera.

17. The method as recited in claim 14, wherein the obfuscation component comprises a lens cap configured to physically cover a lens of the camera, and wherein the causing comprises sending an instruction to an actuator coupled to the lens cap to move the lens cap to a position in which the lens cap at least partially obfuscate the view of the camera.

18. The method as recited in claim 14, wherein the obfuscation component comprises a light-source configured to emit light substantially parallel to an optical axis of the camera, and wherein the causing comprises sending an instruction to the light-source to emit the light substantially parallel to the optical axis of the camera to at least partially obfuscate the view of the camera.

19. The method as recited in claim 14, wherein the obfuscation component comprises a light-source configured to emit light and a lightguide at least partially within the camera to disseminate the light from the light source to at least partially obfuscate the view of the camera, and wherein the causing comprises sending an instruction to the light-source to emit the light for dissemination by the lightguide.

20. The method as recited in claim 14, wherein the apparatus and a mobile device are associated with a common user account, and further comprising:
   receiving data that the obfuscation component is unable to at least partly obfuscate the view of the camera; and
   sending at least one image generated by the camera to the mobile device.

* * * * *